United States Patent Office.

WILLIAM P. WRIGHT, OF PHILADELPHIA, PENNSYLVANIA, ASSIGNOR TO HIMSELF AND COLLINS W. WALTON, OF SAME PLACE.

Letters Patent No. 76,685, dated April 14, 1868.

IMPROVEMENT IN PROCESS FOR TREATING MUSLIN FOR SWEAT-LININGS, &c., FOR HATS.

The Schedule referred to in these Letters Patent and making part of the same.

TO ALL WHOM IT MAY CONCERN:

Be it known that I, WILLIAM P. WRIGHT, of the city and county of Philadelphia, and State of Pennsylvania, have invented a new and improved Process for Treating Muslin for Straw-Hat Sweats, &c.; and I do hereby declare that the following is a full, clear, and exact description of my process.

The object of my invention is to obtain, by a process hereinafter described, an oiled muslin for straw-hat sweats, &c., which will have sufficient elasticity about it to permit its being stretched around in the hat, without breaking the muslin or peeling off the oil. The oiled muslin now used for sweats, owing to its stiffness, breaks, peels off, and puckers, and is difficult to keep in place.

To enable others skilled in the art to make and use my invention, I will now proceed to describe the process.

I first take ordinary muslin and slightly stiffen it with a size; I then thoroughly dry it, and pass it through a calender, of ordinary construction. A calender is a machine, consisting of a number of heavy iron rollers contained in a massive frame; the rollers are connected with a long lever, loaded with weights at the further extremity, by which, or by means of screws, almost any amount of force may be applied. This pressure and friction produce on the muslin a finish or gloss, flatten the threads, and press them together, or, as I might say, make the meshes smaller, and it is by the drawing up and flattening out of the threads that I get the desired spring and elasticity. I then, after passing the muslin through the above-described process, proceed to apply the oil to the muslin, in the usual manner.

Having thus described my invention and its process, what I claim, and desire to secure by Letters Patent of the United States, is—

The within-described process for treating muslin for hat-sweats, &c., so as to give it elasticity and pliability, as herein set forth and described.

WILLIAM P. WRIGHT.

Witnesses:
 CHARLES H. EVANS,
 ISAAC R. OAKFORD.